(12) United States Patent
Atikoglu et al.

(10) Patent No.: US 10,572,922 B2
(45) Date of Patent: *Feb. 25, 2020

(54) SYSTEM AND METHOD FOR ESTIMATING BAGS NECESSARY FOR ITEMS PURCHASED BY A CONSUMER (71) Applicant: Walmart Apollo, LLC, Bentonville, AR (US)

(72) Inventors: Berk Atikoglu, San Francisco, CA (US); Eytan Daniyalzade, San Francisco, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/231,442

(22) Filed: Dec. 22, 2018

(65) Prior Publication Data

US 2019/0122273 A1    Apr. 25, 2019

Related U.S. Application Data

(63) Continuation of application No. 14/642,363, filed on Mar. 9, 2015, now Pat. No. 10,163,142.

(51) Int. Cl.
*G08B 13/14* (2006.01)
*G06Q 30/06* (2012.01)

(52) U.S. Cl.
CPC ............................ *G06Q 30/0609* (2013.01)

(58) Field of Classification Search
CPC .. A61J 7/02; A61J 7/0481; B25J 13/08; B25J 15/0683; B25J 19/023; B25J 9/026;
(Continued)

(56) References Cited

U.S. PATENT DOCUMENTS

5,194,893 A * 3/1993 Nishi ................... G03F 7/70066
355/53
5,406,761 A 4/1995 Hobbiebrunken et al.
(Continued)

*Primary Examiner* — Daniel Previl
(74) *Attorney, Agent, or Firm* — Bryan Cave Leighton Paisner LLP (57) ABSTRACT

Some embodiments include a system. The system can comprise one or more processors and one or more non-transitory storage devices. The one or more non-transitory storage devices can store computing instructions configured to run on the one or more processors and perform acts of: receiving a transmission from a first mobile device used by an individual in a physical structure, the transmission indicating that the individual will be removing at least one item from the physical structure; retrieving information about the at least one item, the information comprising at least one volume of the at least one item; determining a total volume based on the at least one volume of the at least one item; estimating a number of containers needed for the at least one item, the estimating the number of containers based on the total volume; and forwarding the number of containers needed to an electronic device of a representative of the physical structure to permit the representative to estimate whether the individual is taking unauthorized items out of the physical structure. Other embodiments are disclosed herein.

20 Claims, 6 Drawing Sheets

(58) Field of Classification Search
CPC ........ B25J 9/1697; B65B 35/06; B65B 35/18;
B65B 35/34; B65B 57/14; B65B 57/20;
B65B 5/08; B65G 2201/047; B65G
47/912; B65G 65/36; G05B 15/02; G06F
19/00; G06F 19/3462; G07C 13/00; G07F
11/165; G07F 17/0092; G16H 20/13;
Y10S 901/09; Y10S 901/47; B01D
65/104; B01J 19/0033; B01L 99/00;
B02C 18/142; B02C 19/0075; B65D
2203/12; B65D 41/02; B65D 51/245;
C12M 1/48; G01F 23/26; G01F 23/292;
G01K 1/022; G01K 1/024; G01K 1/14;
G01K 2207/04; G01K 2215/00; G01N
15/0826; G03G 15/553; G03G 15/556;
G06K 19/063; G06K 19/0723; G06K
7/00; G06K 7/0008; G06T 19/006; G08B
13/08; G08B 13/149; Y10T 29/49764;
G06Q 10/10; G06Q 2230/00

USPC ..... 340/568.1, 539.1, 426.2, 426.21, 426.16, 340/461, 568.5, 572.1, 588, 613, 636.11
See application file for complete search history.

(56) References Cited

U.S. PATENT DOCUMENTS

| | | | | |
|---|---|---|---|---|
| 5,553,945 | A | * | 9/1996 | Blaurock ............ F16C 29/0604 384/10 |
| 5,673,049 | A | | 9/1997 | Kitchen |
| 5,832,303 | A | * | 11/1998 | Murase ................ H04L 49/101 710/36 |
| 10,163,142 | B2 | * | 12/2018 | Atikoglu ............ G06Q 30/0609 |
| 2008/0015956 | A1 | | 1/2008 | Regard |
| 2010/0063891 | A1 | | 3/2010 | Townsend et al. |
| 2011/0065420 | A1 | | 3/2011 | Reyes |
| 2012/0061473 | A1 | * | 3/2012 | Forster ............. G06K 19/07718 235/492 |
| 2013/0080289 | A1 | * | 3/2013 | Roy ...................... G06Q 10/10 705/26.8 |
| 2014/0365341 | A1 | * | 12/2014 | MacLaurin ........ G06Q 30/0635 705/26.81 |

* cited by examiner

tem, article, device, or apparatus that comprises a list of elements is not necessarily limited to those elements, but might include other elements not expressly listed or inherent to such process, method, system, article, device, or apparatus.

SYSTEM AND METHOD FOR ESTIMATING BAGS NECESSARY FOR ITEMS PURCHASED BY A CONSUMER

CROSS REFERENCE TO RELATED APPLICATIONS

This application is a continuation of application Ser. No. 14/642,363, filed on Mar. 9, 2015, which is herein incorporated by reference in its entirety.

TECHNICAL FIELD

This disclosure relates generally to retail businesses, and relates more particularly to security at retail businesses.

BACKGROUND

Typically, when a consumer desires to purchase an item at certain types of retail businesses, the consumer chooses his items, then brings them to a cashier, who determines the amount owed by the consumer. In some instances, the consumer may perform his own check-out duties. In a new method of checking out, a user can utilize handheld technology to purchase items. There is a desire to have security over the new methods of checking out.

BRIEF DESCRIPTION OF THE DRAWINGS

To facilitate further description of the embodiments, the following drawings are provided in which.

For simplicity and clarity of illustration, the drawing figures illustrate the general manner of construction, and descriptions and details of well-known features and techniques might be omitted to avoid unnecessarily obscuring the present disclosure. Additionally, elements in the drawing figures are not necessarily drawn to scale. For example, the dimensions of some of the elements in the figures might be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but might include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements can be electrically coupled together, but not be mechanically or otherwise coupled together. Coupling can be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Some embodiments include a system. The system can comprise one or more processors and one or more non-transitory storage devices. The one or more non-transitory storage devices can store computing instructions configured to run on the one or more processors and perform acts of: receiving a transmission from a first mobile device used by an individual in a physical structure, the transmission indicating that the individual will be removing at least one item from the physical structure; retrieving information about the at least one item, the information comprising at least one volume of the at least one item; determining a total volume based on the at least one volume of the at least one item; estimating a number of containers needed for the at least one item, the estimating the number of containers based on the total volume; and forwarding the number of containers needed to an electronic device of a representative of the physical structure to permit the representative to estimate whether the individual is taking unauthorized items out of the physical structure.

Some embodiments can include a method. The method can be implemented via execution of computing instructions configured to run at one or more processors and configured to be stored at non-transitory computer-readable media. The method can comprise: receiving a transmission from a first mobile device used by an individual in a physical structure, the transmission indicating that the individual will be removing at least one item from the physical structure; retrieving information about the at least one item, the information comprising at least one volume of the at least one item; determining a total volume based on the at least one volume of the at least one item; estimating a number of containers needed for the at least one item, the estimating the number of containers based on the total volume; and forwarding the number of containers needed to an electronic device of a representative of the physical structure to permit the representative to estimate whether the individual is taking unauthorized items out of the physical structure.

Some embodiments include a method. The method can comprise: receiving a transmission indicating an intention by a consumer to purchase an item; retrieving information about the item from a database; associating the information about the item and the consumer in a transaction; estimating a number of bags used for the transaction; and forwarding the estimated number of bags to a mobile device to determine the likelihood of unpurchased items taken by the consumer.

Some embodiments include a system. The system can comprise: a user input device; a display device; one or more processing modules; and one or more non-transitory storage modules storing computing instructions configured to run on the one or more processing modules and perform the acts of: receiving a transmission indicating an intention by a consumer to purchase an item; retrieving information about the item from a database; associating the information about the item and the consumer in a transaction; estimating a number of bags used for the transaction; and forwarding the estimated number of bags to a mobile device.

Further embodiments include at least one non-transitory memory storage module having computer instructions stored thereon executable by one or more processing modules to: receive a transmission indicating an intention by a consumer to purchase an item; retrieve information about the item from a database; associate the information about the item and the consumer in a transaction; estimate a number of bags used for the transaction; and forward the estimated number of bags to a mobile device, to determine the likelihood of unpurchased items being taken by the consumer.

Figure 1:
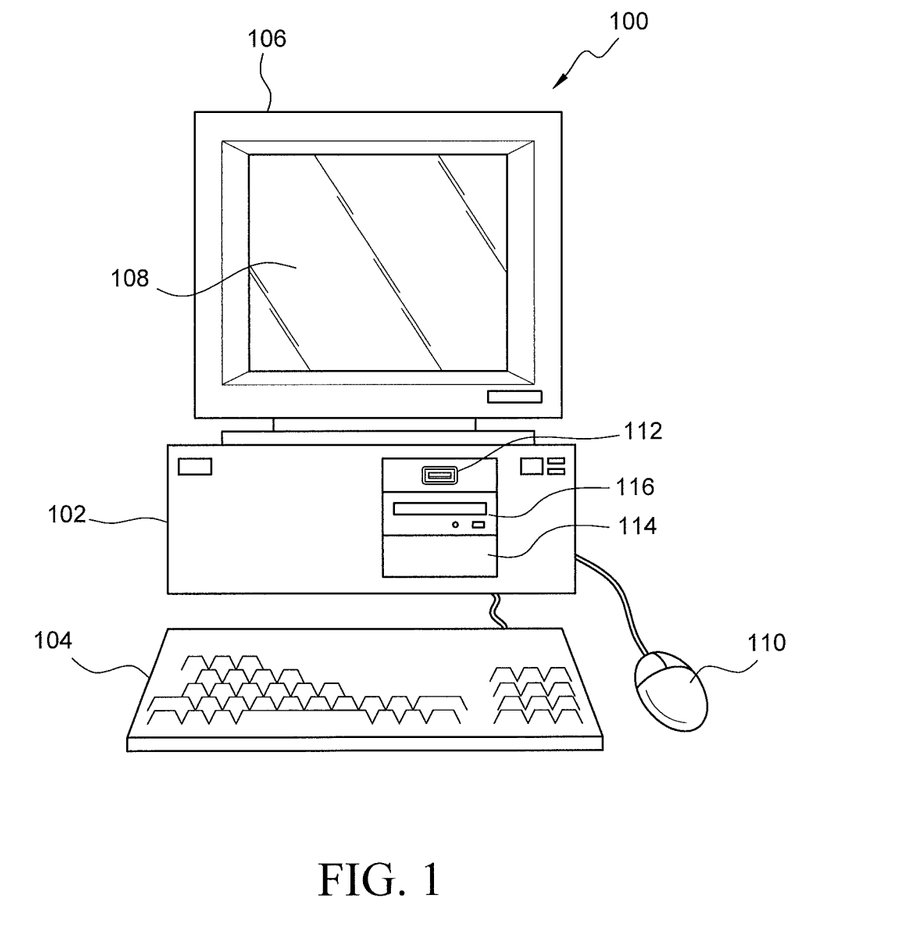
FIG. 1 illustrates a front elevation view of a computer system that is suitable for implementing at least part of a central computer system.
Figure 2:
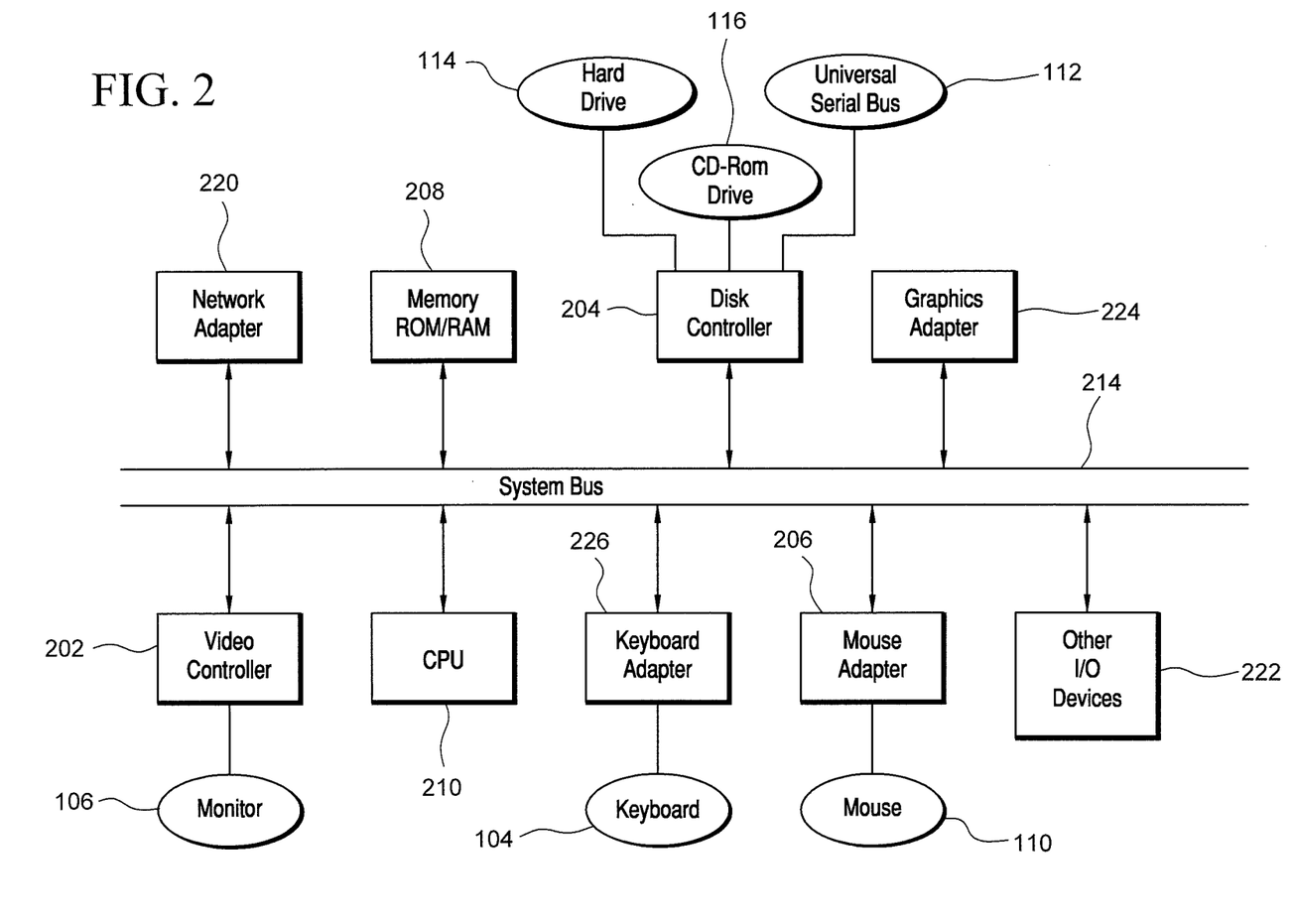
FIG. 2 illustrates a representative block diagram of exemplary elements included on the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) can also be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) volatile (e.g., transitory) memory, such as, for example, read only memory (ROM) and/or (ii) non-volatile (e.g., non-transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), CD-ROM and/or DVD drive 116 (FIGS. 1-2), a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
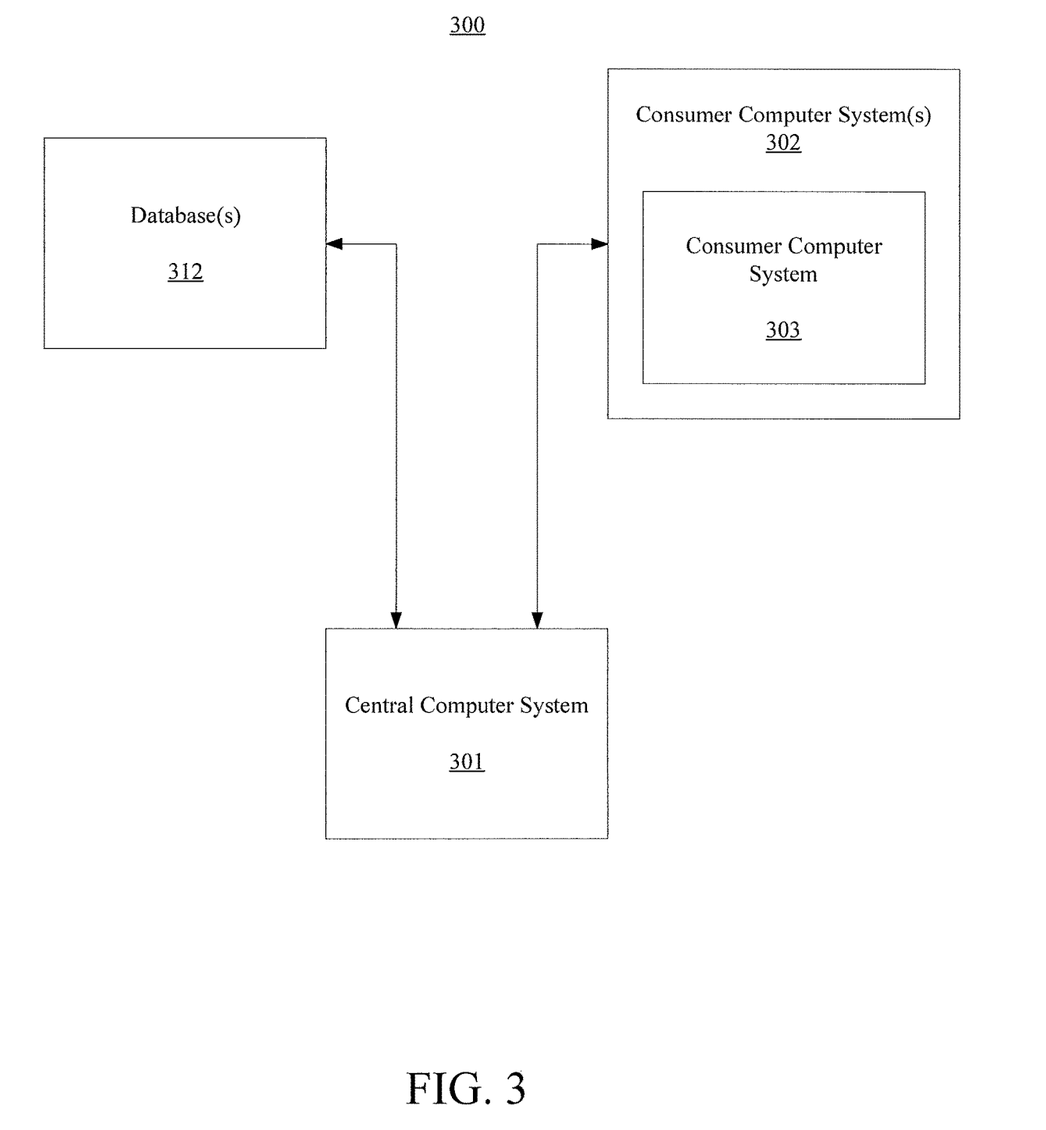
FIG. 3 illustrates a representative block diagram of a system, according to an embodiment.

Skipping ahead now in the drawings, FIG. 3 illustrates a representative block diagram of a system 300, according to an embodiment. System 300 is merely exemplary and embodiments of the system are not limited to the embodiments presented herein. System 300 can be employed in many different embodiments or examples not specifically depicted or described herein. In some embodiments, certain elements or modules of system 300 can perform various methods and/or activities of those methods. In these or other embodiments, the methods and/or the activities of the methods can be performed by other suitable elements or modules of system 300.

As further described in greater detail below, in these or other embodiments, system 300 can proactively (e.g., prospectively) and/or reactively (e.g., responsively) determine and/or communicate the consumer product information to the consumer, as desired. Proactive acts can refer to acts (e.g., identification, determination, communication, etc.) performed without consideration of one or more acts performed by the consumer, and reactive acts can refer to acts (e.g., identification, determination, communication, etc.) performed with consideration of (i.e., in response to) one or more acts performed by the consumer. For example, in some embodiments, the act(s) can comprise an act of identifying a selection of a consumer product by the consumer.

Meanwhile, as also described in greater detail below, system 300 can be implemented in brick-and-mortar commerce and/or electronic commerce applications, as desirable. Further, in many of these or other embodiments, system 300 can communicate the consumer product information to the consumer substantially in real-time (e.g., near real-time). Near real-time can mean real-time less a time delay for processing (e.g., determining) and/or transmitting the relevant consumer product information to the relevant consumer. The particular time delay can vary depending on the type and/or amount of the consumer product information, the processing speed(s) of the processing module(s) of system 300, the transmission capability of the communication hardware (as introduced below), the transmission distance, etc. However, in many embodiments, the time delay can be less than approximately one, five, ten, or twenty minutes.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Specifically, system 300 comprises a central computer system 301. In many embodiments, central computer system 301 can be similar or identical to computer system 100 (FIG. 1). Accordingly, central computer system 301 can comprise one or more processing modules and one or more memory storage modules (e.g., one or more non-transitory memory storage modules). In these or other embodiments, the processing module(s) and/or the memory storage module(s) can be similar or identical to the processing module(s) and/or memory storage module(s) (e.g., non-transitory memory storage modules) described above with respect to computer system 100 (FIG. 1). In some embodiments, central computer system 301 can comprise a single computer or server, but in many embodiments, central computer system 301 comprises a cluster or collection of computers or servers and/or a cloud of computers or servers. Meanwhile, central computer system 301 can comprise one or more input devices (e.g., one or more keyboards, one or more keypads, one or more pointing devices such as a computer mouse or computer mice, one or more touchscreen displays, etc.), and/or can comprise one or more display devices (e.g., one or more monitors, one or more touch screen displays, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of central computer system 301 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of central computer system 301. In a similar manner, the processing module(s) and the memory storage module(s) can be local and/or remote to each other.

In many embodiments, central computer system 301 is configured to communicate with one or more consumer computer systems 302 (e.g., a consumer computer system 303) of one or more consumers. For example, the consumer(s) can interface (e.g., interact) with central computer system 301, and vice versa, via consumer computer system(s) 302 (e.g., consumer computer system 303). Accordingly, in many embodiments, central computer system 301 can refer to a back end of system 300 operated by an operator and/or administrator of system 300, and consumer computer system(s) 302 can refer to a front end of system 300 used by one or more users of system 300 (i.e., the consumer(s)). In these or other embodiments, the operator and/or administrator of system 300 can manage central computer system 301, the processing module(s) of computer system 301, and/or the memory storage module(s) of computer system 301 using the input device(s) and/or display device(s) of central computer system 301. In some embodiments, system 300 can comprise consumer computer system(s) 302 (e.g., consumer computer system 303).

Like central computer system 301, consumer computer system(s) 302 each can be similar or identical to computer system 100 (FIG. 1), and in many embodiments, each of consumer computer system(s) 302 can be similar or identical to each other.

In many embodiments, consumer computer system(s) 302 can comprise one or more desktop computer devices, one or more wearable user computer devices, and/or one or more mobile devices, etc. At least part of central computer system 301 can be located remotely from consumer computer system(s) 302.

In some embodiments, a mobile device can refer to a portable electronic device (e.g., an electronic device easily conveyable by hand by a person of average size) with the capability to present audio and/or visual data (e.g., images, videos, music, etc.). For example, a mobile device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can comprise a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile device, and vice versa. However, a wearable user computer device does not necessarily comprise a mobile device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ or a similar product by Google Inc. of Menlo Park, Calif., United States of America; (ii) the Eye Tap™, the Laser Eye Tap™, or a similar product by ePI Lab of Toronto, Ontario, Canada, and/or (iii) the Raptyr™, the STAR 1200™, the Vuzix Smart Glasses M100™, or a similar product by Vuzix Corporation of Rochester, N.Y., United States of America. In other specific examples, a head mountable wearable user computer device can comprise the Virtual Retinal Display™, or similar product by the University of Washington of Seattle, Wash., United States of America. Meanwhile, in further specific examples, a limb mountable wearable user computer device can comprise the iWatch™, or similar product by Apple Inc. of Cupertino, Calif., United States of America, the Galaxy Gear or similar product of Samsung Group of Samsung Town, Seoul, South Korea, the Moto 360 or similar product of Motorola of Schaumburg, Ill., United States of America, and/or the Zip™, One™, Flex™, Charge™, Surge™, or similar product by Fitbit Inc. of San Francisco, Calif., United States of America.

In further embodiments, central computer system 301 can be configured to communicate with software (e.g., one or more web browsers, one or more mobile software applications, etc.) of the consumer computer system(s) 302 (e.g., consumer computer system 303). For example, the software can run on one or more processing modules and can be stored on one or more memory storage modules (e.g., one or more non-transitory memory storage modules) of the consumer computer system(s) 302 (e.g., consumer computer system 303). In these or other embodiments, the processing module(s) of the consumer computer system(s) 302 (e.g., consumer computer system 303) can be similar or identical to the processing module(s) described above with respect to computer system 100 (FIG. 1). Further, the memory storage module(s) (e.g., non-transitory memory storage modules) of the consumer computer system(s) 302 (e.g., consumer computer system 303) can be similar or identical to the memory storage module(s) (e.g., non-transitory memory storage module(s)) described above with respect to computer system 100 (FIG. 1). Exemplary web browsers can include (i) Firefox® by the Mozilla Organization of Mountain View, Calif., United States of America, (ii) Internet Explorer® by the Microsoft Corp. of Redmond, Wash., United States of America, (iii) Chrome™ by Google Inc. of Menlo Park, Calif., United States of America, (iv) Opera® by Opera Software of Oslo, Norway, and (v) Safari® by Apple Inc. of Cupertino, Calif., United States of America.

Meanwhile, in many embodiments, central computer system 301 also can be configured to communicate with one or more databases 312. The database can comprise a product database that contains information about products sold by a retailer. Database(s) 312 can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of database(s) 312, that particular database can be stored on a single memory storage module of the memory storage module(s) and/or the non-transitory memory storage module(s) storing database(s) 312 or it can be spread across multiple of the memory storage module(s) and/or non-transitory memory storage module(s) storing database(s) 312, depending on the size of the particular database and/or the storage capacity of the memory storage module(s) and/or non-transitory memory storage module(s).

In these or other embodiments, the memory storage module(s) of central computer system 300 can comprise some or all of the memory storage module(s) storing database(s) 312. In further embodiments, some of the memory storage module(s) storing database(s) 312 can be part of consumer computer systems 302 and/or one or more third-party computer systems (i.e., other than central computer system 301 and consumer computer systems 302), and in still further embodiments, all of the memory storage module(s) storing database(s) 312 can be part of consumer computer systems 302 and/or the third-party computer system(s). Like central computer system 301 and consumer computer system(s) 302, when applicable, each of the third-party computer system(s) can be similar or identical to computer system 100 (FIG. 1). Notably, the third-party computer systems are omitted from the drawings to better illustrate that database(s) 312 can be stored at memory storage module(s) of central computer system 301, consumer computer system(s) 302, and/or the third-party computer systems, depending on the manner in which system 300 is implemented.

Database(s) 312 each can comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between central computer system 301, consumer computer system(s) 302 (e.g., consumer computer system 303), and/or database(s) 312 can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.)

For convenience, the functionality of system 300 is described herein as it relates particularly to consumer computer system 303 and a single consumer, but in many embodiments, the functionality of system 300 can be extended to each of consumer computer system(s) 302 and/or to multiple consumers. In these extended examples, in some embodiments, single consumers can interface (e.g., interact) with central computer system 301 with multiple consumer computer systems of consumer computer system(s) 302 (e.g., at different times). For example, a consumer could interface with central computer system 301 via a first consumer computer system (e.g., a desktop computer), such as, for example, when interfacing with central computer system 301 from home, and via a second consumer computer system (e.g., a mobile device), such as, for example, when interfacing with central computer system 301 away from home.

In many types of retail businesses, the retail business uses a checkout model for purchases. A consumer chooses one or more items that he/she wishes to purchase. The consumer then presents the one or more items to an employee of the retail business. The employee proceeds to determine the total cost of the items, receives payment from the consumer, then provides the items to the consumer.

There are various alternative arrangements for allowing a consumer to purchase items from a brick and mortar retail business. For example, there is the "self-checkout" model. In the self-checkout model, after a consumer selects the goods he wishes to purchase, the consumer scans items for purchases. Generally, there are one or more self-checkout stands in one area of the brick and mortar retail business. Thus, one employee can monitor the check-out of multiple consumers at the same time, instead of needing one employee for each line of consumers.

A novel method of allowing consumers to shop is a technology that some retailers call scan and go. Briefly, in a scan and go methodology, a consumer uses a mobile device to indicate his purchases as he travels through a retailer. When he wants to leave the retailer, he performs a checkout. To more thoroughly describe this process, refer to FIG. 4.

Figure 4:
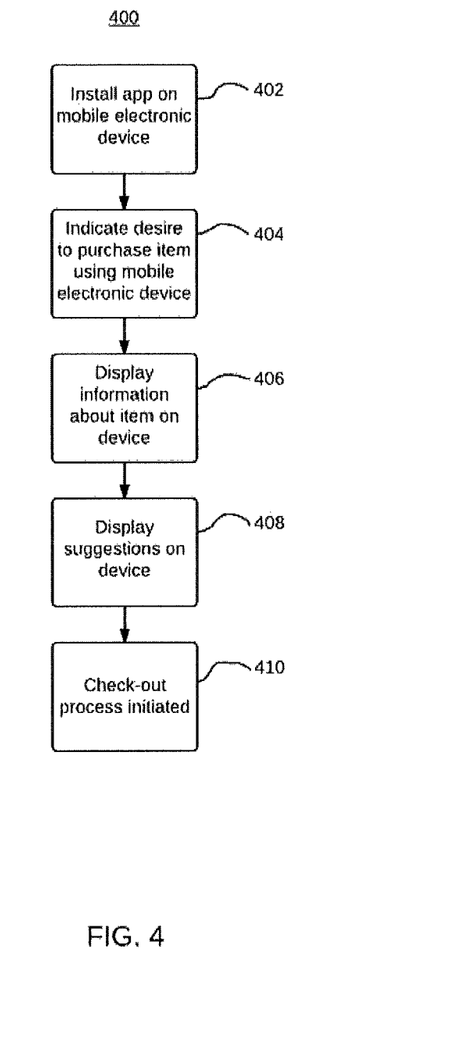
FIG. 4 is a flowchart illustrating a method according to an embodiment.

A flowchart illustrating the operation of a scan and go methodology 400 is presented in FIG. 4. Method 400 is merely exemplary and is not limited to the embodiments presented herein. Method 400 can be employed in many different embodiments or examples not specifically depicted or described herein. In some embodiments, the procedures, the processes and/or the activities of method 400 can be performed in the order presented. In other embodiments, the procedures, the processes, and/or the activities of method 400 can be performed in any other suitable order. In still other embodiments, one or more of the procedures, the processes, and/or the activities of method 400 can be combined or skipped. In some embodiments, portions of method 400 can be implemented by computer system 100 (FIG. 1).

A consumer installs an app on a mobile device (block 402). Referring back to FIG. 3, the mobile device can be one of consumer computer system(s) 302. As described above, a variety of different mobile devices can be used. A smartphone would be the most common type of portable electronic device that would be used in such a scenario. Other mobile devices such as phablets, tablets, portable music players, special-purpose scanning devices, wearable electronic devices, and other electronic devices that have internet connectivity also can be used. In some embodiments, instead of a consumer installing an app on his mobile device, a consumer can use a special-purpose electronic device. In some embodiments, such a special-purpose electronic device can be provided by the retailer.

Returning to FIG. 4, the consumer then travels through a retailer's store to find items he wishes to purchase. When he finds an item he wishes to purchase, he uses the mobile device to indicate the desire to purchase the item (block 404). This indication can be accomplished in one of a variety of different manners.

For example, as described above, there can be an application (also known as an "app") in a mobile device that can provide a consumer with the ability to scan items to be purchased. The app would use a camera of the mobile device to scan or to take a photograph of the universal product code (UPC), international standard book number (ISBN), or other unique identifier of the product that the consumer wishes to purchase. With reference to FIG. 3, the mobile device (e.g., consumer computer system 303) can be in communication with central computer system 301. Central computer system 301 is in communication with one or more databases 312. Among databases 312, there can be a product database containing information about each product sold by the retailer.

Returning to FIG. 4, the app then searches a database (such as a product database) to find the product and displays information about the product on the mobile device (block 406). The user can be provided with an opportunity to confirm the purchase. In some embodiments, the app can also provide suggestions to the consumer (block 408). For example, the app can inform the consumer that a different size of the product is on sale. The app can suggest products that are often purchased with the chosen product (e.g., suggesting fabric softener when a consumer chooses a laundry detergent). Many other features also can be present.

After the consumer finishes shopping, the consumer approaches a checkout area of the retailer. However, because the consumer already scanned each of the items he wishes to purchase using the mobile device, in some embodiments, he does not need to scan the items again. Instead, in such embodiments, the consumer needs only to pay for the items. The consumer begins the checkout process (block 410). This can involve using the mobile device to enter payment information. In some embodiments, the consumer has the capability to provide and store payment information into the mobile device. For example, the consumer can store credit card information (such as an account number, an expiration date, and a card security code) in the mobile device. In that type of situation, the consumer can indicate his desire to apply the previously entered payment information to the purchase. The consumer also can pay for the selected goods using cash or a check through a terminal at the retailer. The consumer will typically place the purchase products in plastic bags, paper bags, reusable bags, boxes, and the like for ease in transporting the goods.

In some uses, a consumer would be able to select goods and pay for the goods without any interaction with employees of the retailer. While such a feature can make the shopping experience faster for the consumer, there can be an increased risk of shoplifting and other types of theft, both intentional and inadvertent. Because no employee looked at the consumer's shopping cart or at their payment transaction, it is possible that a consumer could fill a shopping cart with goods, pay for only a portion of the goods, then walk out of the retailer's store with goods that were not paid for.

One method of reducing such a risk is to place an employee at an exit of the retailer. The employee would be tasked with comparing the receipt of the consumer with the purchases. Several retail businesses use such a model. However, in general, such a practice is limited to warehouse clubs such as Sam's Club, Costco, and BJs Wholesale Club. The number of consumers in a retail store might make it too time consuming to investigate the purchases of all the consumers. Finally, in some embodiments, not all of the consumers use such a scan and go system. There will be a significant percentage of consumers who make purchases in a traditional manner, where one or more employees have already looked at the consumer's purchases. It would be desirable to have a method that reduces and discourages shoplifting and is relatively unobtrusive to consumers.

Figure 5:
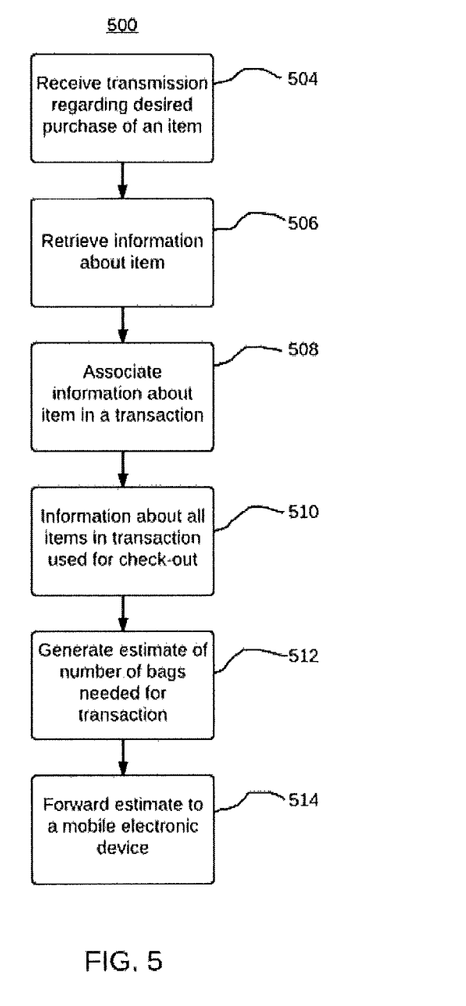
FIG. 5 is a flowchart illustrating a method according to an embodiment.

A flowchart illustrating the operation of a theft deterrence methodology 500 is presented in FIG. 5. Method 500 is merely exemplary and is not limited to the embodiments presented herein. Method 500 can be employed in many different embodiments or examples not specifically depicted or described herein. In some embodiments, the procedures, the processes and/or the activities of method 500 can be performed in the order presented. In other embodiments, the procedures, the processes, and/or the activities of method 500 can be performed in any other suitable order. In still other embodiments, one or more of the procedures, the processes, and/or the activities of method 500 can be combined or skipped. In some embodiments, portions of method 500 can be implemented by computer system 100 (FIG. 1).

As above, an app produces a transmission from a consumer indicating a desire to purchase an item. Information regarding the item is transmitted to a central computer system (block 504). The transmission can be from a mobile device that is configured to transmit information based on scanning a unique identifier (such as a UPC or ISBN) of the item. The information being transmitted to the central computer system can comprise the unique identifier.

Information about the item is retrieved from a database that is accessed by the central computer system (block 506). The database can be one or more of database(s) 312 from FIG. 3. Thereafter, information about the item is associated with a transaction, along with information about the consumer (block 508). When the consumer begins a checkout process, the information about all items in the transaction are retrieved such that the consumer can initiate a payment process (block 510). The information about the items in the transaction can include a variety of different types of information. For payment purposes, the price of the item will be included in the information. Also included in the information can be a variety of aspects of the product(s) that can be used to produce an estimate of the number of bags used by a consumer.

The information about the items in the present purchase used to produce an estimate of the number of bags can include volume information, weight information, size of the packaging of the item, and likelihood of the product being placed with other products.

Volume and weight can be used to determine the likelihood of an item being placed in a bag with other items. In a simple formulation, the total volume of the goods in the transaction can be calculated and the total weight of the goods in the transaction can be calculated and the total volume and the total weight of the goods can be divided by the volume and weight capacity of the bags. Volume can mean the physical size occupied by the packaging of the item. Volume also can mean the amount of liquid being in a unit of an item. Some items can be large in both volume and weight. For example, a large bottle of laundry detergent or a large bag of pet food can be too large to be placed in a bag with other goods and, in some cases, can be too big to be placed in a bag.

This total can be adjusted based on the types of goods in the transaction. As discussed above, some items can be too large to be placed in bags, so the estimate of the number of bags used can be adjusted to reflect that fact. In many types of retail stores, there can be certain types of goods that will likely be placed in a bag without other goods. Examples can include fragile items (e.g., eggs, items with glass, or a bag of potato chips), crushable items (e.g., a loaf of bread can be crushed if something heavy is placed on top of it), temperature-sensitive items (e.g., one might not wish to place frozen food items with hot items, such as already prepared food items, to prevent the temperatures of the items from changing drastically), items capable of cross-contamination, (e.g., raw meat items might not be expected to be placed in a bag with other goods.) The estimate of the total number of bags used can be increased if such items are in the transaction.

Information about bagging products used by the retailer also can be stored in one of the databases 312 (FIG. 3) and used to create an estimate for the number of bags. For example, the capacity of the bag, both in volume and in weight—if a retailer's bag can hold 10 pounds, an embodiment can assume that any product more than 10 pounds will not be bagged. If a retailer has more than one type of bag, for example, both plastic and paper bags, an embodiment, can provide an estimate in each of the types of bag. Thus, an embodiment might estimate that eight plastic bags would be needed for a particular purchase, but only five paper bags would be needed. A retailer might have more than two types of bags available and such bags would also be taken into account. Exemplary other types of bags include small bags for small items (e.g., jewelry) and special purpose bags intended to designate specific items (e.g., prescription bags and produce bags).

Using the volume, weight, and likelihood information, an estimate of the number of bags used by the consumer for this transaction is generated (block 512). This estimate can be forwarded to an employee stationed at an exit of the retailer (such as a greeter, auditor, or security personnel) (block 514).

The employee can have a mobile device. The employee's mobile device can be in communication with central computer system 301 (FIG. 3). The communication can be in one of a variety of different methods. Exemplary methods can include any type of wired or wireless technology described above (including, but not limited to Ethernet, WiFi, and cellular network protocols).

The employee can then compare the estimate of the number of bags used by the consumer to the number of bags actually used by the consumer to determine whether or not the employee should conduct a more thorough examination of the consumer's purchases.

The operation of an embodiment can be explained further through the use of an exemplary consumer. An exemplary consumer can select the following items for purchase: a loaf of bread, a carton of eggs, a box of laundry detergent, three bottles of spices, four shirts, six pairs of socks, a swimsuit, and a bag of potato chips. As the consumer travels through the retailer and scans in each of the above items, the characteristics of each item are also stored. When the consumer initiates the checkout process, the consumer will input or authorize payment information and place the items in a bag. An embodiment will generate an estimate of the number of bags used by the consumer. An embodiment might estimate that the bread, eggs, potato chips, and laundry detergent will each be in separate bags. The bread might be in a separate bag so it does not get crushed by other items. The eggs might be in a separate bag to avoid being broken. The potato chips might be in a separate bag to avoid breaking the chips by crushing. The laundry detergent might be too large (either in volume or weight) to be placed with other items. The embodiment might further estimate that, due to the size and weight of the spices, shirts, socks, and swimsuit, they can all be placed in a single bag. Therefore, the embodiment will generate an estimate of five bags used by the consumer. This estimate will be forwarded to an employee at an entrance/exit to the retailer. When the consumer attempts to exit the store, the employee at the entrance/exit of the retailer will compare the number of bags in the consumer's shopping cart to the estimate. If the consumer has, for example, seven bags, the employee can be prompted to initiate a more thorough examination of the consumer's purchases, to ensure that the consumer accounted for all of his items in the checkout process. But if the consumer has four bags, the employee can be prompted to take no further action with that particular consumer, because the consumer has an appropriate number of bags for the items he purchased. There can be some flexibility in the estimate of the number of bags because some consumers are less efficient at bagging their items and others are more efficient. In addition, the grouping of items in a bag might be a judgment call (for example, some consumers might prefer the potato chips to be in the same bag as the loaf of bread while other consumers might prefer that those items be placed in separate bags.

Using an employee (such as a greeter, auditor, or other security personnel) at the exit to examine purchases can serve a variety of different purposes. First, the mere presence of an employee at an exit of a brick and mortar retail store can discourage people who might be tempted to steal from the retail store. Second, the employee will be able to catch inadvertent instances of shoplifting, such as when a consumer's child places items in a consumer's cart without the knowledge of the consumer. The consumer might not realize that certain items in the consumer's shopping cart were not purchased, but the extra bags in the cart will be a sign to the employee.

Figure 6:
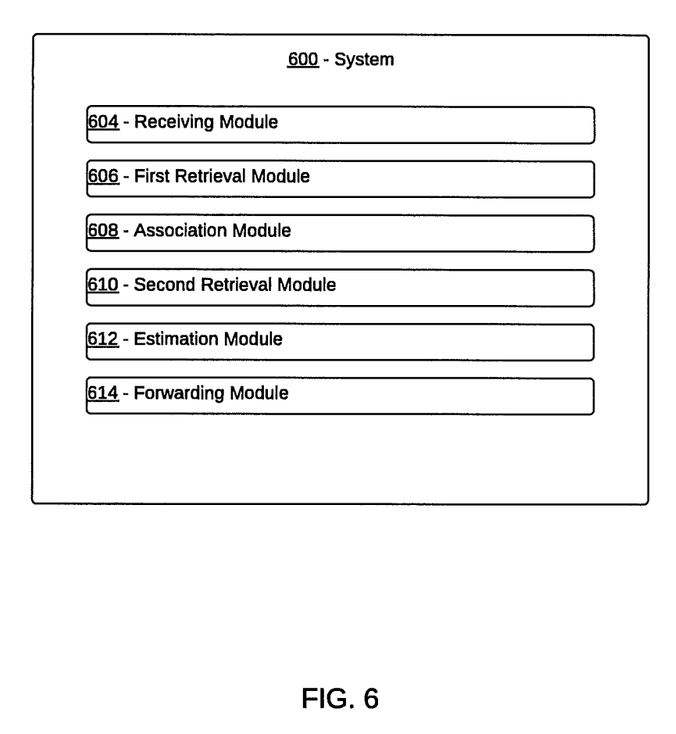
FIG. 6 is a block diagram illustrating a system capable of performing a method according to an embodiment.

Turning ahead in the figures, FIG. 6 illustrates a block diagram of a system 600 that is capable of performing disclosed embodiments. System 600 is merely exemplary and is not limited to the embodiments presented herein. System 600 can be employed in many different embodiments or examples not specifically depicted or described herein. In some embodiments, certain elements or modules of system 600 can perform various procedures, processes, and/or acts. In other embodiments, the procedures, processes, and/or acts can be performed by other suitable elements or modules.

In a number of embodiments, system 600 can include receiving module 604. In certain embodiments, receiving module 604 can perform block 504 (FIG. 5) of receiving information from a consumer indicating a desire to purchase an item.

In a number of embodiments, system 600 can include first retrieval module 606. In certain embodiments, retrieving module 606 can perform block 506 (FIG. 5) of retrieving information about the item from a database.

System 600 can include association module 608. In certain embodiments, association module 608 can perform block 508 (FIG. 5) of associating information about the item with a transaction.

System 600 can include second retrieval module 610. In certain embodiments, second retrieval module 610 can perform block 510 (FIG. 5) of retrieving information regarding a present transaction of the consumer.

System 600 can include estimation module 612. In certain embodiments, estimation module 612 can perform block 512 (FIG. 5) of estimating a number of bags used by the consumer for the present purchase.

System 600 can include forwarding module 614. In certain embodiments, ordering module 614 can perform block 514 of forwarding the estimated number of bags.

While the above description have been with reference to a scan and go system, elements of the above descriptions can be used in other types of shopping experiences also. For example, estimating the number of bags used for a transaction can be useful in traditional "self-checkout" methods as well as in checkout at a terminal by an retailer's employee. In such instances, an employee stationed at an exit (such as an auditor, greeter, or security personnel) can be forwarded an estimate of a customer's number of bags via a mobile device as a means to double-check a customer's purchases.

Although the above embodiments have been described with reference to specific embodiments, it will be understood by those skilled in the art that various changes can be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 can be modified, and that the foregoing discussion of certain of these embodiments does not necessarily represent a complete description of all possible embodiments. For example, one or more of the procedures, processes, or activities of FIGS. 1-6 can include different procedures, processes, and/or activities and be performed by many different modules, in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that can cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
  one or more processors; and
  one or more non-transitory storage devices storing computing instructions configured to run on the one or more processors and perform acts of:
    receiving a transmission from a first mobile device used by an individual in a physical structure, the transmission indicating that the individual is removing at least one item from the physical structure;
    retrieving information about the at least one item, the information about the at least one item comprising at least one volume of the at least one item;

determining a total volume based on the at least one volume of the at least one item;

estimating a number of containers needed for the at least one item, wherein the number of containers needed is based on the total volume; and forwarding the number of containers needed to an electronic device of a representative of the physical structure to permit the representative to estimate whether the individual is taking unauthorized items out of the physical structure.

2. The system of claim 1, wherein the computing instructions are further configured to run on the one or more processors and perform acts of:

determining an actual number of containers used by the individual;

comparing the number of containers needed to the actual number of containers used by the individual; and sending instructions to the electronic device of the representative to instruct the representative to conduct a security search of the individual when the actual number of containers used exceeds the number of containers needed.

3. The system of claim 1, wherein:

the at least one item comprises multiple items;

the computing instructions are further configured to run on the one or more processors and perform an act of receiving container size information for at least one container type, the container size information for the at least one container type comprising at least one of:

(1) a respective volume capacity of each respective container type of the at least one container type; or (2) a respective weight capacity of each respective container type of the at least one container type;

the information about the at least one item comprises information about the multiple items, including, for each respective item of the multiple items, at least one of:

(1) a respective weight of a respective item of the multiple items; or (2) a respective volume of the respective item of the multiple items; and determining the total volume comprises:

totaling the respective weight of the respective item or the respective volume of the respective item, for each respective item of the multiple items, to determine a total weight and the total volume; and dividing the total weight by the respective weight capacity of the at least one container type, and dividing the total volume by the respective volume capacity of the at least one container type, to estimate the number of containers needed.

4. The system of claim 3, wherein:

receiving the container size information for the at least one container type comprises receiving the container size information for multiple container types, the container size information for the multiple container types comprising:

at least one of:

(1) a first volume capacity for a first container type of the multiple container types; or (2) a first weight capacity for the first container type of the multiple container types; and at least one of:

(1) a second volume capacity for a second container type of the multiple container types; or (2) a second weight capacity for the second container type of the multiple container types; and estimating the number of containers needed for the at least one item further comprises:

estimating a first number of containers of the first container type for the at least one item; and estimating a second number of containers of the second container type for the at least one item.

5. The system of claim 3, wherein:

estimating the number of containers needed for the at least one item further comprises:

for each respective item of the multiple items, determining when the respective item is too large to be placed in a container; and when the respective item is too large to be placed in the container, decreasing the number of containers needed.

6. The system of claim 3, wherein:

estimating the number of containers needed for the at least one item further comprises:

for each respective item of the multiple items, determining when the respective item is likely to be placed in a separate container with no other items of the multiple items; and when the respective item is likely to be placed in the separate container with no other items of the multiple items, increasing the number of containers needed.

7. The system of claim 6, wherein:

determining when the respective item is likely to be placed in the separate container comprises analyzing criteria chosen from at least one of:

a fragility of the respective item;

a crushability of the respective item;

a temperature-sensitivity of the respective item; or a cross-contamination possibility of the respective item.

8. The system of claim 1, wherein:

the first mobile device comprises a mobile device belonging to the individual; and the computing instructions are further configured to run on the one or more processors and perform an act of transmitting instructions to the first mobile device for installing a mobile application associated with the physical structure on the first mobile device.

9. The system of claim 1, wherein the first mobile device is configured to perform acts of:

scanning a unique identifier associated with the at least one item; and transmitting, to the system, the transmission indicating that the individual is removing the at least one item.

10. The system of claim 1, wherein:

the physical structure comprises a brick and mortar retail business;

the individual comprises a customer of the brick and mortar retail business; and the number of containers needed comprises a number of bags needed.

11. A method being implemented via execution of computing instructions configured to run at one or more processors and configured to be stored at non-transitory computer-readable media, the method comprising:

receiving a transmission from a first mobile device used by an individual in a physical structure, the transmission indicating that the individual is removing at least one item from the physical structure;

retrieving information about the at least one item, the information about the at least one item comprising at least one volume of the at least one item;

determining a total volume based on the at least one volume of the at least one item;

estimating a number of containers needed for the at least one item, wherein the number of containers needed is based on the total volume; and forwarding the number of containers needed to an electronic device of a representative of the physical structure to permit the representative to estimate whether the individual is taking unauthorized items out of the physical structure.

12. The method of claim 11 further comprising:

determining an actual number of containers used by the individual;

comparing the number of containers needed to the actual number of containers used by the individual; and sending instructions to the electronic device of the representative to instruct the representative to conduct a security search of the individual when the actual number of containers used exceeds the number of containers needed.

13. The method of claim 11, wherein:

the at least one item comprises multiple items;

the method further comprises receiving container size information for at least one container type, the container size information for the at least one container type comprising at least one of:
  (1) a respective volume capacity of each respective container type of the at least one container type; or
  (2) a respective weight capacity of each respective container type of the at least one container type;

the information about the at least one item comprises information about the multiple items, including, for each respective item of the multiple items, at least one of:
  (1) a respective weight of a respective item of the multiple items; or
  (2) a respective volume of the respective item of the multiple items; and determining the total volume comprises:
  totaling the respective weight of the respective item or the respective volume of the respective item, for each respective item of the multiple items, to determine a total weight and the total volume; and
  dividing the total weight by the respective weight capacity of the at least one container type, and dividing the total volume by the respective volume capacity of the at least one container type, to estimate the number of containers needed.

14. The method of claim 13, wherein:

receiving the container size information for the at least one container type comprises receiving the container size information for multiple container types, the container size information for the multiple container types comprising:
  at least one of:
    (1) a first volume capacity for a first container type of the multiple container types; or
    (2) a first weight capacity for the first container type of the multiple container types; and
  at least one of:
    (1) a second volume capacity for a second container type of the multiple container types; or
    (2) a second weight capacity for the second container type of the multiple container types; and estimating the number of containers needed for the at least one item further comprises:
  estimating a first number of containers of the first container type for the at least one item; and
  estimating a second number of containers of the second container type for the at least one item.

15. The method of claim 13, wherein:

estimating the number of containers needed for the at least one item further comprises:
  for each respective item of the multiple items, determining when the respective item is too large to be placed in a container; and
  when the respective item is too large to be placed in the container, decreasing the number of containers needed.

16. The method of claim 13, wherein:

estimating the number of containers needed for the at least one item further comprises:
  for each respective item of the multiple items, determining when the respective item is likely to be placed in a separate container with no other items of the multiple items; and
  when the respective item is likely to be placed in the separate container with no other items of the multiple items, increasing the number of containers needed.

17. The method of claim 16, wherein:

determining when the respective item is likely to be placed in the separate container comprises analyzing criteria chosen from at least one of:
  a fragility of the respective item;
  a crushability of the respective item;
  a temperature-sensitivity of the respective item; or
  a cross-contamination possibility of the respective item.

18. The method of claim 11, wherein:

the first mobile device comprises a mobile device belonging to the individual; and the method further comprises transmitting instructions to the first mobile device for installing a mobile application associated with the physical structure on the first mobile device.

19. The method of claim 11, wherein the first mobile device is configured to perform acts of:

scanning a unique identifier associated with the at least one item; and transmitting the transmission indicating that the individual is removing the at least one item.

20. The method of claim 11, wherein:

the physical structure comprises a brick and mortar retail business;

the individual comprises a customer of the brick and mortar retail business; and the number of containers needed comprises a number of bags needed.

* * * * *